United States Patent [19]

Linzenich

[11] Patent Number: 5,539,168
[45] Date of Patent: Jul. 23, 1996

[54] POWER CIRCUIT BREAKER HAVING A HOUSING STRUCTURE WITH ACCESSORY EQUIPMENT FOR THE POWER CIRCUIT BREAKER

[75] Inventor: Uwe Linzenich, Simmerath, Germany

[73] Assignee: Klöckner-Moeller GmbH, Bonn, Germany

[21] Appl. No.: 403,508

[22] Filed: Mar. 13, 1995

[30] Foreign Application Priority Data

Mar. 11, 1994 [DE]  Germany ................ 44 08 234.7

[51] Int. Cl.$^6$ ................................................. H01H 3/04
[52] U.S. Cl. ................................................... 200/303
[58] Field of Search .................................. 200/47, 48 R, 200/50 R, 401, 330, 293, 295, 296; 218/1, 22, 155

[56] References Cited

U.S. PATENT DOCUMENTS

| | | | |
|---|---|---|---|
| 3,054,025 | 9/1962 | Wih-Edmunds | 200/296 |
| 4,622,444 | 11/1986 | Kandatsu et al. | 200/303 |
| 4,831,221 | 5/1989 | Yu et al. | 200/303 X |
| 4,855,549 | 8/1989 | Toda et al. | 200/401 |
| 4,884,048 | 11/1989 | Castonguay et al. | 200/303 X |
| 5,362,933 | 11/1994 | Kutsche et al. | 200/401 |
| 5,440,088 | 8/1995 | Coudert et al. | 200/303 |

FOREIGN PATENT DOCUMENTS

| | | |
|---|---|---|
| 4235504 | 4/1993 | Germany. |
| 9203533 | 8/1993 | Germany. |

Primary Examiner—Renee S. Luebke
Attorney, Agent, or Firm—Nils H. Ljungman and Associates

[57] ABSTRACT

A circuit breaker having a housing structure with accessory devices for power circuit breakers, which housing structure can essentially eliminate the need for complex and expensive methods for the insertion and positioning of the accessory devices in the main housing of the power circuit breaker. For that purpose, in the rear portion of the narrow side walls of the accessory housing enclosing an accessory device, there are first rigid guide and retaining members and second rigid retaining members located opposite one another, interacting with these members are a rigid third guide and retaining member and a flexible fourth retaining member, which are located in a recess of the top part of the main housing, which recess contains the accessory housing or housings. Actuator elements of the accessory devices, if any, and the corresponding bottom actuator openings in the recess interact as second and third guide members.

14 Claims, 6 Drawing Sheets

POWER CIRCUIT BREAKER HAVING A HOUSING STRUCTURE WITH ACCESSORY EQUIPMENT FOR THE POWER CIRCUIT BREAKER

BACKGROUND OF THE INVENTION

1. Field of the Invention

The present invention generally relates to a housing structure with accessory equipment for power circuit breakers with a molded housing. In particular, the present invention relates to a housing structure intended to hold auxiliary control switches as supplementary devices, however, the housing in accordance with the present invention can also be used for other accessory equipment of a power circuit breaker.

2. Background Information

Such a housing structure is disclosed in U.S. Pat. No. 4,622,444, on which housing the upper part of the main housing, on one side or on both sides of the actuator handle, has a recess or recesses which are open on the side. An accessory device with an appropriately shaped accessory housing can be inserted into each of the recesses from the front, whereby the front walls of the main housing and of the accessory housing end at one another. For the correct insertion of the accessory equipment, on the two side walls of the accessory housing covered by the main housing, there are a pair of guide strips which are guided in a pair of guide grooves on the inside walls of the recesses of the upper part of the main housing. The accessory housing, on the outside wall, has a pair of retaining shackles pointing backward, for which there is an additional pair of guide grooves on the outside of the bottom part of the main housing. The additional pair of guide grooves have a locking lug, each for interaction with the respective elastic retaining shackles. Extending from the accessory housing, which is open on the back, an actuator element of the accessory device extends through an actuator opening in the bottom of the top part of the main housing into the inside of the power circuit breaker. The connection openings of the accessory device are on the uncovered outside wall of the accessory device.

The disadvantages of this known device include the fact that, for each accessory device, a corresponding recess is required and thus a maximum of two accessory devices can be inserted, that a special accessory housing is necessary for the accessory equipment, and that a number of means, all of which require close tolerances, are necessary for the guidance and mounting of the accessory housing. Thus, the insertion and the extraction of the accessory device typically requires a corresponding amount of skill and force, and the connections of the accessory equipment are not easy to install, since they are accessible only from the side.

German Utility Model No. 92 03 533, which corresponds to U.S. Pat. No. 5,362,933, discloses a power circuit breaker which has two recesses, one on either side of the actuator handle, located in the upper portion of the main housing, and which recesses can be covered by a pivoting cover. Accessory devices are located in the recesses, whereby these accessory devices are attached to the bottoms of the recesses and the electrical connection elements are oriented toward the front side. This publication does not disclose any information concerning the probable mechanical couplings between the power circuit breaker and the auxiliary control switches or accessory devices in the recesses.

German Laid Open Patent Application No. 42 35 504 discloses a housing structure for a power circuit breaker in which accessory devices enclosed by accessory housings are not attached directly in the upper portion of the main housing. In particular, an electrically insulating base is used, in which one or more accessory housings can be removably attached. The base itself is removably located in a recess. Since the base is located between the upper part and the accessory housings, the latter are not restricted by the shape and size of the recesses, and accessory devices with different accessory housings can be attached by using different bases. This publication also discloses a direct installation of the accessory housings in a recess in the top part. The retaining means used are elastic hooks which are molded onto the narrow sides of the accessory devices, which hooks enter into a locking connection with the upper part during the insertion of the accessory device, as well as a pivoting cover. The underside of the pivoting cover matches the shape of the accessory housings. The retaining means in this case function exclusively as retainers. The side walls of the recess act to some extent as guide means.

OBJECT OF THE INVENTION

The object of the present invention is therefore to create a housing structure which, when a multiplicity or otherwise generally usable accessory devices are used, makes possible easier handling and accessibility of the accessory equipment.

SUMMARY OF THE INVENTION

The present invention teaches that this object can be accomplished by means of a housing structure having simplified guide and retaining means for the accessory equipment. The housing structure is configured for enclosing a power circuit breaker, and the housing structure preferably includes a main housing, which main housing can have a bottom part and a front-side top part, and at least one accessory housing, from which accessory housing an actuator element can project toward the rear. The accessory housing can be configured to enclose an accessory device and can contain, in the forward area of narrow side walls, connection openings whose terminal means can preferably be actuated from the front side. On one side or on both sides, next to the actuator handle in the top part, there can be a recess or recesses, which recess is essentially enclosed by outside walls. The outside walls can extend perpendicular to the front side. The accessory device can be inserted in the recess from the front side, and can sit rearward on the base of the recess. The base can preferably have a slot-shaped actuator opening, which actuator opening can guide the actuator element of the accessory device.

On the accessory housing, in the rear portion of the narrow side walls, on one hand there can be a rigid, interlocking first guide and retaining means with a first retaining shoulder, which first guide and retaining means extend essentially perpendicular to the front side. On the other hand, there can preferably be a rigid, interlocking second retaining means, which second retaining means can have a second retaining shoulder.

From the opposite inside walls of the recess, essentially diagonally in relation to the base of the recess, toward the middle of the recess, at least one rigid third guide and retaining means can extend, which third guide and retaining means can preferably interact with the first guide and retaining means, In addition, there can preferably be flexible fourth retaining means, which fourth retaining means interact with the second retaining means.

The guide and retaining means in accordance with the present invention can preferably make possible a simple, easy and secure installation of the accessory devices in the housing, during which process mixups and/or incorrect installations of the accessory devices can essentially be avoided. As a result of the interaction between the first and third guide and retaining means, and between the second and fourth guide means, a correct and secure insertion of the accessory devices in the recess can essentially be guaranteed. The reliable positioning of the accessory devices can then preferably be accomplished by the clip-like engagement of the second and fourth retaining means, with very little application of force. The accessory devices can be retrofitted and subsequently replaced essentially without any major effort. Essentially all that is required to detach the second retaining means from the fourth retaining means is a slight pressure directed away from the accessory device exerted by means of a suitable object, e.g. a screwdriver, whereupon the accessory device can be removed from the recess, if necessary. The actuation of the terminal means of the accessory equipment from the front makes possible an easily accessible and compact electrical connection between the accessory equipment and the signal lines.

It should be emphasized that the housing structure in accordance with the present invention advantageously makes possible the use of accessory devices like those which are already commonly used in the form of control and signalling units in the form of contact elements.

The first and second guide and retaining means in accordance with the present invention, as well as the third and fourth retaining means, are particularly appropriate and compact models for providing easy insertion and positioning of the accessory equipment, and for the effective absorption of transverse forces. As such, the shaping of the housing structure can preferably be realized without the complex and expensive use of lateral slides. As a result of the additional presence of a support web on the fourth retaining means, the recess can preferably be reinforced on the bottom, and can advantageously absorb longitudinal forces on the accessory device, e.g. such as those which occur during installation and connection. This, in turn, can preferably lead to a reduction of the load on the fourth retaining means, and can also make it possible to use relatively soft molding materials for the upper part, in spite of the temperatures expected in the recess. The guide indentation and the guide web further facilitate the straight-line insertion of the accessory equipment.

An additional advantage of one preferred embodiment of the present invention is the essentially parallel orientation of a multiplicity of third guide and retaining means, fourth retaining means and actuator openings in the same recess, preferably for the parallel positioning of several accessory devices. The covering of the recess or recesses, with or without accessory equipment positioned inside them, preferably by means of the pivoting cover, can serve to protect the power circuit breaker and the installed accessory equipment from external influences.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a circuit breaker comprising: a housing structure; at least one electrical contact area disposed within the housing structure, the at least one electrical contact area having a stationary contact member; at least one breaker mechanism for connecting and disconnecting with the at least one electrical contact area, the at least one breaker mechanism being movably disposed within the housing structure; apparatus for manually connecting and disconnecting the at least one breaker mechanism with the at least one electrical contact area; the apparatus for manually connecting and disconnecting being pivotably displaceable between a first position and a second position; the at least one breaker mechanism comprising: contact carrier apparatus pivotably disposed within the housing structure, the contact carrier apparatus having a movable contact member for contacting the stationary contact member of the at least one electrical contact area to complete an electrical circuit; apparatus for operatively connecting the apparatus for manually connecting and disconnecting with the contact carrier apparatus, the apparatus for operatively connecting being configured for pivotally displacing the contact carrier apparatus with respect to the at least one electrical contact area; the housing structure comprising: a main housing comprising a bottom part and a front-side top part, which housing substantially encloses the circuit breaker; at least one accessory housing, from which an actuator element projects toward the rear, and each of which encloses an accessory device and contains, in the forward area of its narrow side walls connection openings, whose terminal apparatus can be actuated from the front side; on one side or on both sides adjacent the apparatus for manually connecting and disconnecting in the top part, there is a recess which is essentially enclosed by outside walls which extend perpendicular to the front side, in which recess the accessory device can be inserted from the front side, and sits rearward on the base of the recess, whereby the base has a slot-shaped actuator opening which guides the actuator element; on the accessory housing, in the rear portion of its narrow side walls, on one hand there is a rigid, interlocking first guide and retaining apparatus which extend substantially perpendicular to the front side, and on the other hand a rigid, interlocking second retaining apparatus, which have a first retaining shoulder and a second retaining shoulder respectively; and from the opposite inside walls of the recess, essentially diagonally in relation to the base, toward the middle, extends at least one rigid third guide and retaining apparatus which interact with the first guide and retaining apparatus, and flexible fourth retaining apparatus which interact with the second retaining apparatus, respectively.

Another aspect of the invention resides broadly in a method of assembling a circuit breaker, the circuit breaker comprising: a housing structure; at least one electrical contact area disposed within the housing structure, the at least one electrical contact area having a stationary contact member; at least one breaker mechanism for connecting and disconnecting with the at least one electrical contact area, the at least one breaker mechanism being movably disposed within the housing structure; apparatus for manually connecting and disconnecting the at least one breaker mechanism with the at least one electrical contact area; the apparatus for manually connecting and disconnecting being pivotably displaceable between a first position and a second position; the at least one breaker mechanism comprising: contact carrier apparatus pivotably disposed within the housing structure, the contact carrier apparatus having a movable contact member for contacting the stationary contact member of the at least one electrical contact area to complete an electrical circuit; apparatus for operatively connecting the apparatus for manually connecting and disconnecting with the contact carrier apparatus, the apparatus for operatively connecting being configured for pivotally displacing the contact carrier apparatus with respect to the at least one electrical contact area; the housing structure comprising: a main housing comprising a bottom part and a front-side top part, which main housing substantially encloses the circuit breaker; at least one accessory housing, from which an actuator element projects toward the rear, and each of which encloses an accessory device and contains, in the forward area of its narrow side walls connection openings, whose terminal apparatus can be actuated from the front side; on one side or on both sides adjacent the apparatus for manually connecting and disconnecting in the top part, there is a recess which is essentially enclosed by outside walls which extend perpendicular to the front side, in which recess the accessory device can be inserted from the front side, and sits rearward on the base of the recess, whereby the base has a slot-shaped actuator opening which guides the actuator element; on the accessory housing, in the rear portion of its narrow side walls, on one hand there is a rigid, interlocking first guide and retaining apparatus which extend substantially perpendicular to the front side, and on the other hand a rigid, interlocking second retaining apparatus, which have a first retaining shoulder and a second retaining shoulder respectively; and from the opposite inside walls of the recess, essentially diagonally in relation to the base, toward the middle, extends at least one rigid third guide and retaining apparatus which interact with the first guide and retaining apparatus, and flexible fourth retaining apparatus which interact with the second retaining apparatus, respectively, the method comprising the steps of: providing a housing structure; providing at least one electrical contact area, the at least one electrical contact area having a stationary contact member; providing at least one breaker mechanism for connecting and disconnecting with the at least one electrical contact area; providing apparatus for manually connecting and disconnecting the at least one breaker mechanism with the at least one electrical contact area, the apparatus for manually connecting and disconnecting being pivotably displaceable between a first position and a second position; the step of providing the at least one breaker mechanism further comprising: providing contact carrier apparatus, the contact carrier apparatus having a movable contact member for contacting the stationary contact member of the at least one electrical contact area to complete an electrical circuit; providing apparatus for operatively connecting the apparatus for manually connecting and disconnecting with the contact carrier apparatus, the apparatus for operatively connecting being configured for pivotally displacing the contact carrier apparatus with respect to the at least one electrical contact area; the step of providing the housing structure further comprising: providing a main housing comprising a bottom part and a front-side top part; providing at least one accessory housing, from which an actuator element projects toward the rear, and each of which encloses an accessory device and contains, in the forward area of its narrow side walls connection openings, whose terminal apparatus can be actuated from the front side; providing the top part with a recess on one side or on both sides adjacent the apparatus for manually connecting and disconnecting, the recess being essentially enclosed by outside walls which extend perpendicular to the front side; providing the recess with a base, whereby the base has a slot-shaped actuator opening which guides the actuator element; providing a first guide and retaining apparatus having a first retaining shoulder, the first guide and retaining apparatus extending substantially perpendicular to the front side; providing a rigid, interlocking second retaining apparatus having a second retaining shoulder; providing at least one rigid third guide and retaining apparatus; providing flexible fourth retaining apparatus; the method further comprising the steps of: disposing the electrical contact area within the housing structure; movably disposing the at least one breaker mechanism within the housing structure; pivotably disposing the contact carrier apparatus within the housing structure; disposing the first guide and retaining apparatus on the accessory housing in the rear portion of its narrow side walls; disposing the third guide and retaining apparatus essentially diagonally in relation to the base, toward the middle of the recess; and inserting the accessory device in the recess from the front side, such that the accessory device sits rearward on the base of the recess, and such that the first guide and retaining apparatus interacts with the third guide and retaining apparatus, and the second retaining apparatus interacts with the fourth retaining apparatus.

BRIEF DESCRIPTION OF THE DRAWINGS

The present invention and its specific features and advantages are explained in greater detail below with reference to the accompanying drawings, in which.

DESCRIPTION OF THE PREFERRED EMBODIMENT

Figure 1:
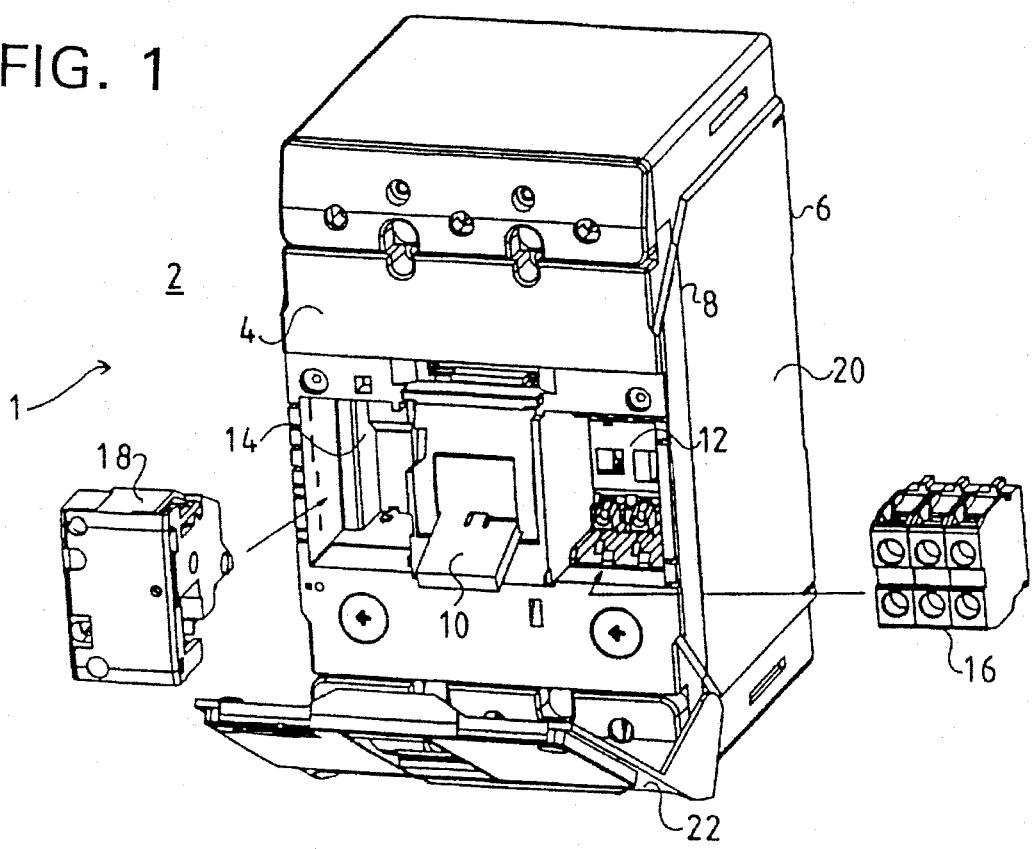
FIG. 1 shows a perspective view of a power circuit breaker with a housing structure in accordance with the present invention.
Figure 3:
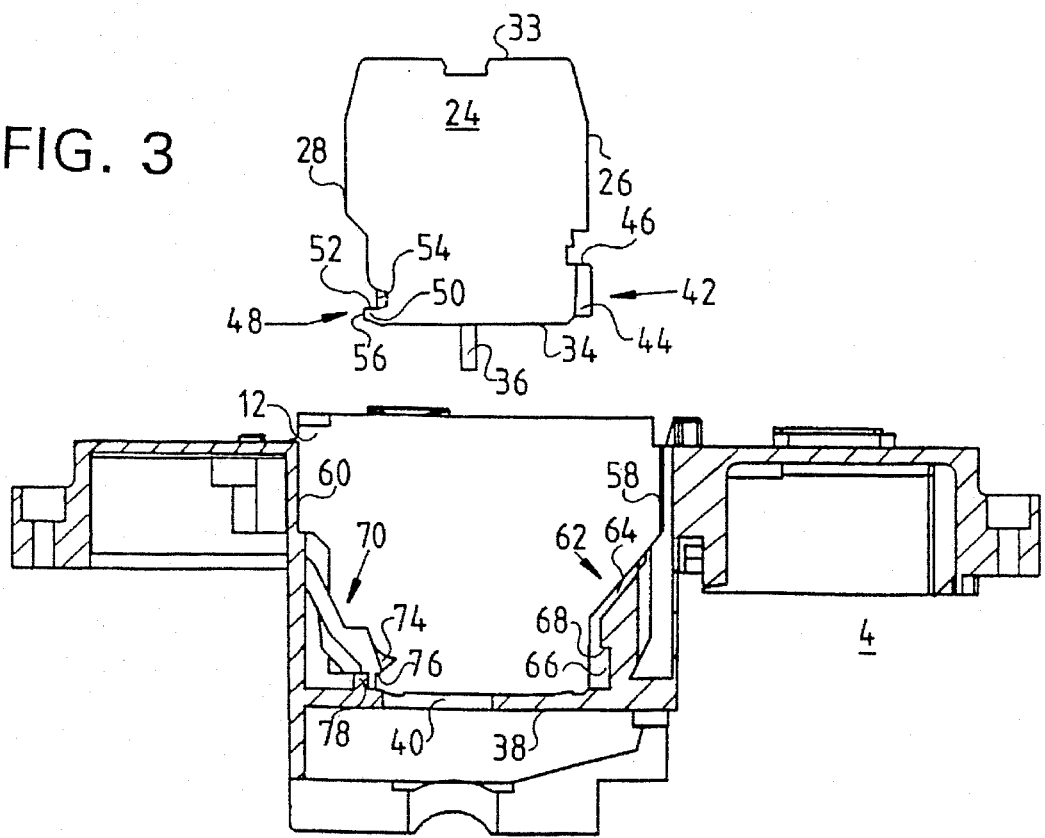
FIG. 3 shows a cross section of the embodiment illustrated in FIGS. 2 and 2a, with the accessory equipment removed.
Figure 1A:
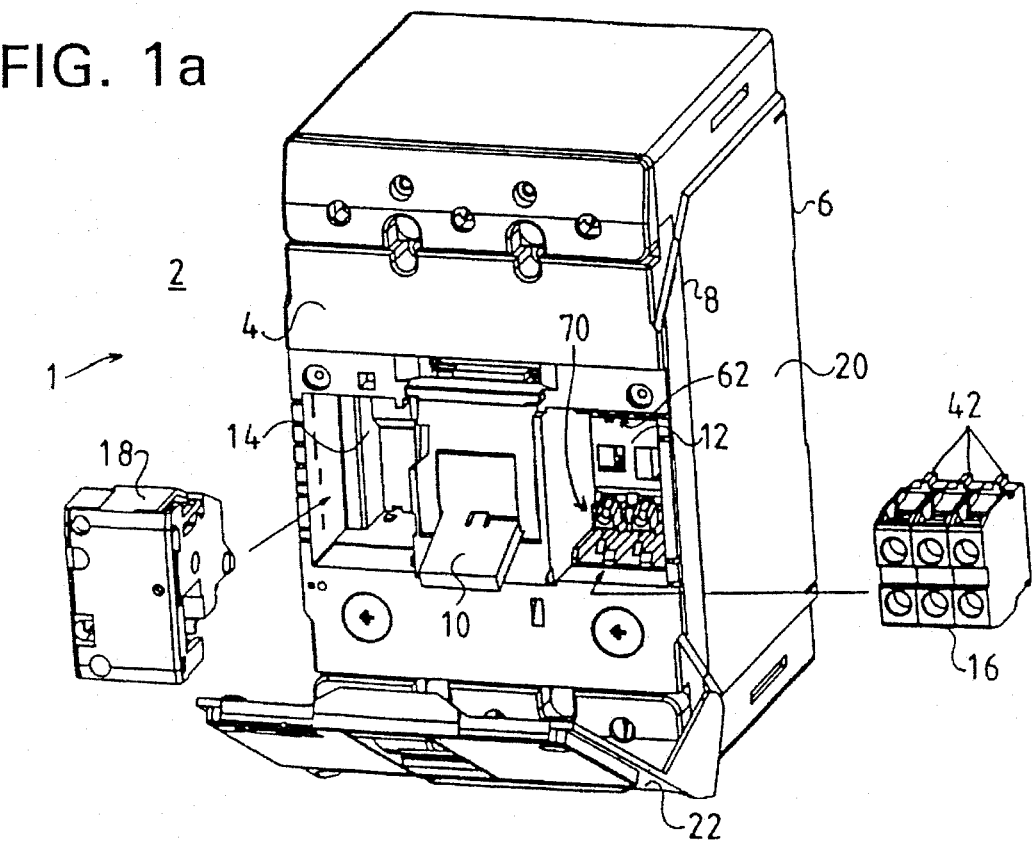
FIG. 1a shows essentially the same view as FIG. 1, but is more detailed.
Figure 3A:
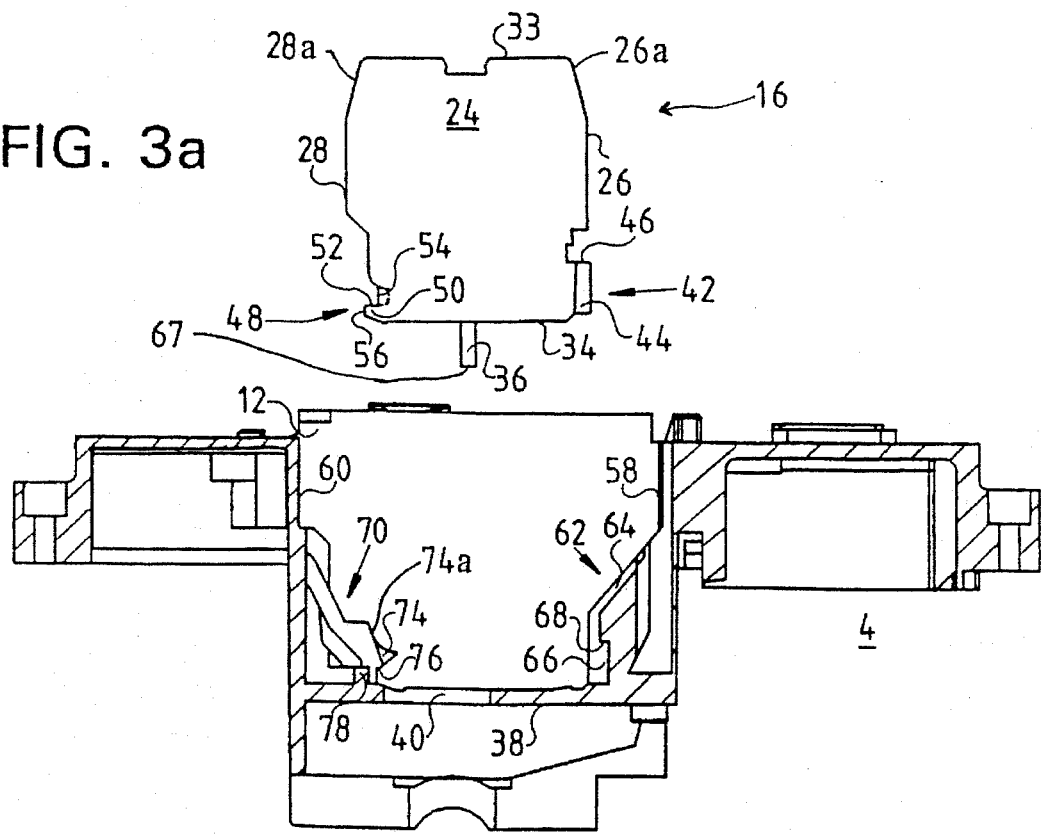
FIG. 3a shows essentially the same view as FIG. 3, but is more detailed.

FIGS. 1 and 1a show a power circuit breaker 1, which circuit breaker 1 can preferably be enclosed by a main housing 2. The main housing 2 can preferably be made of injection molded plastic, and can include a front-side top part 4 and a bottom part 6. The top part 4 and the bottom part 6 of the main housing 2 preferably butt up against one another at a mold seam 8. Projecting from the top part 4 there can be an actuator handle 10, which actuator handle can be a part of an actuator mechanism for the contact systems of the multipole power circuit breaker to be switched. In the top part 4 of the housing 2, to the right of the actuator handle 10, there can preferably be a first recess 12, and to the left of the actuation handle 10, toward the back, there can be a second recess 14. The first recess 12 can contain three auxiliary control switches as first accessory devices 16. Such switches or devices 16 are generally known in the art as contact elements of a control and signalling system. The second recess 14 can preferably be used to contain a different, second accessory device 18, e.g. an undervoltage release. The accessory devices 16, 18 can preferably be oriented in the housing 2 by means of corresponding guide and retaining means. The guide and retaining means, which are described in greater detail further below, can preferably be disposed in the top part 4, essentially parallel to external side walls 20 of the main housing 2, and can be enclosed on the sides and the back by the recesses 12, 14, and on the front end at the top part 4. The recesses 12, 14 and the accessory devices 16, 18 can be covered by means of a pivoting cover 22, which cover 22 can be fastened by means of a hinge on the top part 4. Detailed explanations of the housing structure in accordance with the present invention are given below, however, only with reference to the example of the first recess 12 and the first accessory devices 16. It should be understood, however, that the second recess 14 can preferably be configured in accordance with the present invention, as can the accessory device 14, although not specifically illustrated.

As illustrated in FIGS. 2, 2a, 3, and 3a, the accessory devices 16 can each be enclosed by an essentially identical accessory housing 24. Each accessory housing 24 can preferably have narrow side walls 26, 28, which side walls 26, 28 can have slightly beveled portions 28a, 26a (see FIG. 3a). The side walls 26, 28, in these forward, beveled portions 28a, 26a, can preferably each have a connection opening 30 for the auxiliary control switch connecting terminals. The auxiliary control switch connection terminals can be easily actuated by means of access openings 32 (see FIGS. 2 and 2a) in a front wall 33 (see FIGS. 3 and 3a) of the accessory housing 24, e.g. by using a screwdriver. Projecting from a rear wall 34 of the accessory housing 24, which housing 24 can essentially be closed on all sides, there can preferably be an actuator element 36 to be actuated by the actuator mechanism of the power circuit breaker for the auxiliary contacts of the accessory device 16. The actuator element 36 can preferably have an essentially rectangular cross-section.

In accordance with one embodiment of the present invention, the recess 12 can preferably have a base 38 located in the rearmost portion of the recess 12, with respect to the top part 4. The base 38, along with two side walls 60 and 58 of the recess 12, can form the recess 12.

The accessory housing 24, when inserted into the main housing 2, can preferably sit with its rear wall 34 on or against the base 38 of the recess 12. The base 38 can preferably be interrupted by an actuator opening 40 for receiving the actuator element 36. In the rear portion of the right narrow side wall 26 of the accessory housing 24, there can be first guide and retaining means 42. The first guide and retaining means 42 can include a rigid guide strip 44, which guide strip 44 can extend substantially perpendicular to the front wall 33 of the accessory housing 24. The guide strip 44 can preferably be located in essentially the center of the side wall 26, and can have a first retaining shoulder 46 on the end surface of the guide strip 44, which shoulder 46 faces the front wall 33. On the rear lateral edge of the left narrow side wall 28, there can preferably be a rigid second retaining means 48 in the form of a locking lug 50. A portion of the front surface of the lug 50 can form a second retaining shoulder 52. A depression 54 can proceed from this second retaining shoulder 52, and is directed toward the center of the accessory housing 24. The recess 54 can preferably be limited laterally and can be disposed essentially in the center of the side wall 28. The locking lug 50 can preferably have a support surface 56, which support surface 56 is directed away from the side wall 28. In other words, the support surface 56 can preferably face towards side wall 60 when the accessory device 16 is inserted in the housing 2.

On the right inside wall 58 of the recess 12, there can preferably be a rigid third guide and retaining means 62 for each accessory housing 24 to be inserted. In accordance with one embodiment of the present invention, it can be possible to position more than one accessory device 18, 16 in the recesses 12, 14, one next to the other. The third guide and retaining means 62 can include a guide groove 64 on the base 38, which guide groove 64 can preferably be oriented diagonally toward the center of the recess 12. The guide groove 64 on the base side can make a transition into a locating space 66. This locating space 66 preferably extends away from the middle of the recess 12, and the space 66 is recessed and is limited laterally. In accordance with one embodiment, the guide groove 64 can essentially be a vertical groove, and the space 66 can preferably be a horizontal or lateral space. A portion of the surface of the space 66, proceeding from the guide groove 64 and facing toward the base 38, forms a third retaining shoulder 68. During insertion, the guide strip 44 of the accessory housing 24, which is inclined slightly to the right, can be securely guided in the guide groove 64 and can finally be held in place by the locating space 66. In accordance with one embodiment, the guide strip 44 can preferably slide along in groove 64, and when the bottom part 34 of the accessory housing 24 reaches the base 38 of the recess 12, the guide strip 44 can possibly slide slightly laterally into the space 66.

The width of the rectangular actuator opening 40 can preferably be somewhat wider than the width 65 (see FIGS. 2 and 2a) of the actuator element 36, while on the other hand the length of the actuator opening 40 can be significantly greater than the thickness 67 of the actuator element 36. As a result of these relative sizes, the actuator element 36 can also preferably act as a second guide means which interacts with the actuator opening 40. As such, the opening 40 can also act as a fourth guide means, or an additional guide means, to provide security and additional support during the insertion of the accessory housing 24 into the main housing 2. When inserted, the accessory housing 24 can preferably be supported by means of its first retaining shoulder 46 against the third retaining shoulder 68.

On the left inside wall 60 of the recess 12, for each accessory housing 24 to be inserted, there can preferably be tab-shaped, flexible fourth retaining means 70, which preferably extend toward the base 38, diagonally with respect to the center of the recess 12. Again, in accordance with one embodiment, it can be possible to position more than one accessory device 16, 18 in recesses 12, 14. The fourth retaining means 70, on the base side on its free end, can preferably have a central retaining web 74. On both sides of the retaining web 74, the fourth retaining means 70 are offset on the base side from the inside wall 60, which forms a fourth retaining shoulder 76. The fourth retaining shoulder 76 can preferably extend toward the wall 58. During the insertion of the accessory housing 24, the tab-shaped fourth retaining means 70 can be bent by the locking lug 50 toward the inside wall 60. Then, when the rear wall 34 comes into contact with the base 38, the retaining web 74 can be locked into the recess 54, whereupon the second retaining shoulder 52 can be supported on the fourth retaining shoulder 76. The lateral positioning of the accessory housing 24 can essentially be guaranteed by the lateral fixing of the central guide strip 44 in the laterally limited locator space 66 on one hand, and by the central retaining web 74 in the laterally limited depression 54 on the other hand. On the base 38, opposite the free end of the fourth retaining means 70, a supporting web 78 can be formed, which supporting web 78 can extend at right angles with respect to the base 38, through the recess 12. If necessary, the support surface 56 of the accessory housing 24 can be supported against the supporting web 78. Thus, the supporting web 78 can preferably act to absorb the longitudinal forces directed to the inside wall 60, such as the forces which can occur during the insertion and connection of the accessory devices 16. This in turn can make it possible to use a molding material for the top part 4 which is relatively soft under the temperature conditions which are experienced.

The housing structure described above can preferably make it easier to insert the accessory devices 16, 18 into the housing 2 after they have been pre-assembled, i.e. after they have been electrically connected. In addition, after insertion of an accessory device 16, 18 into the housing 2, the present invention provides for a relatively easy removal of the accessory device 16, 18. By using a suitable tool, e.g. a screwdriver, to depress the fourth retaining means 70 toward the left side wall 60, the locked connection between the second retaining means 48 and the fourth retaining means 70 can be easily detached. Then, the accessory device 16 can be easily removed from the recess 12, and if necessary, replaced by another accessory device with an essentially identically shaped accessory housing 24.

Figure 2:
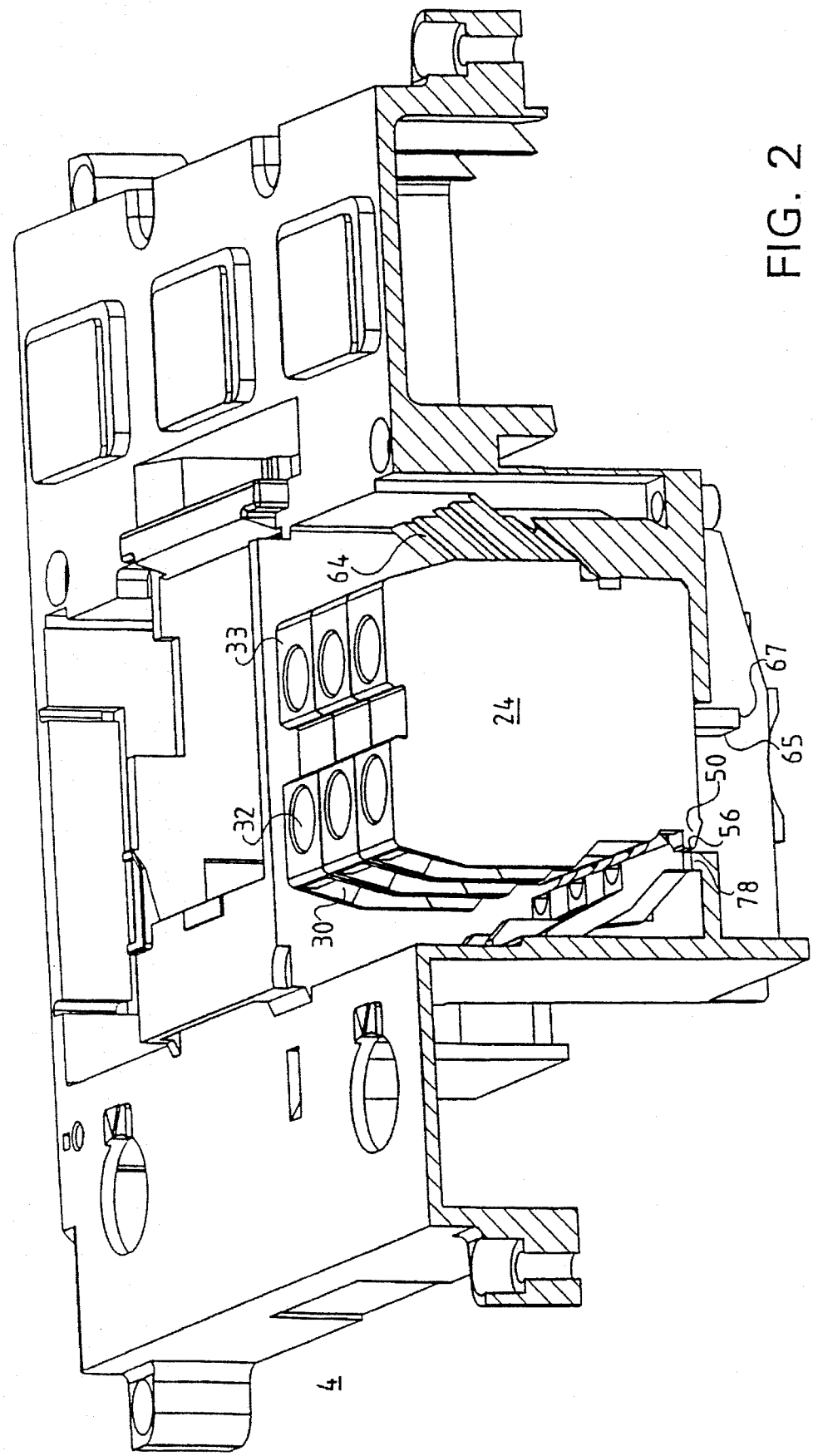
FIG. 2 shows an enlarged sectional perspective view of the top part of the embodiment illustrated in FIGS. 1 and 1a, with the accessory equipment inserted.
Figure 2A:
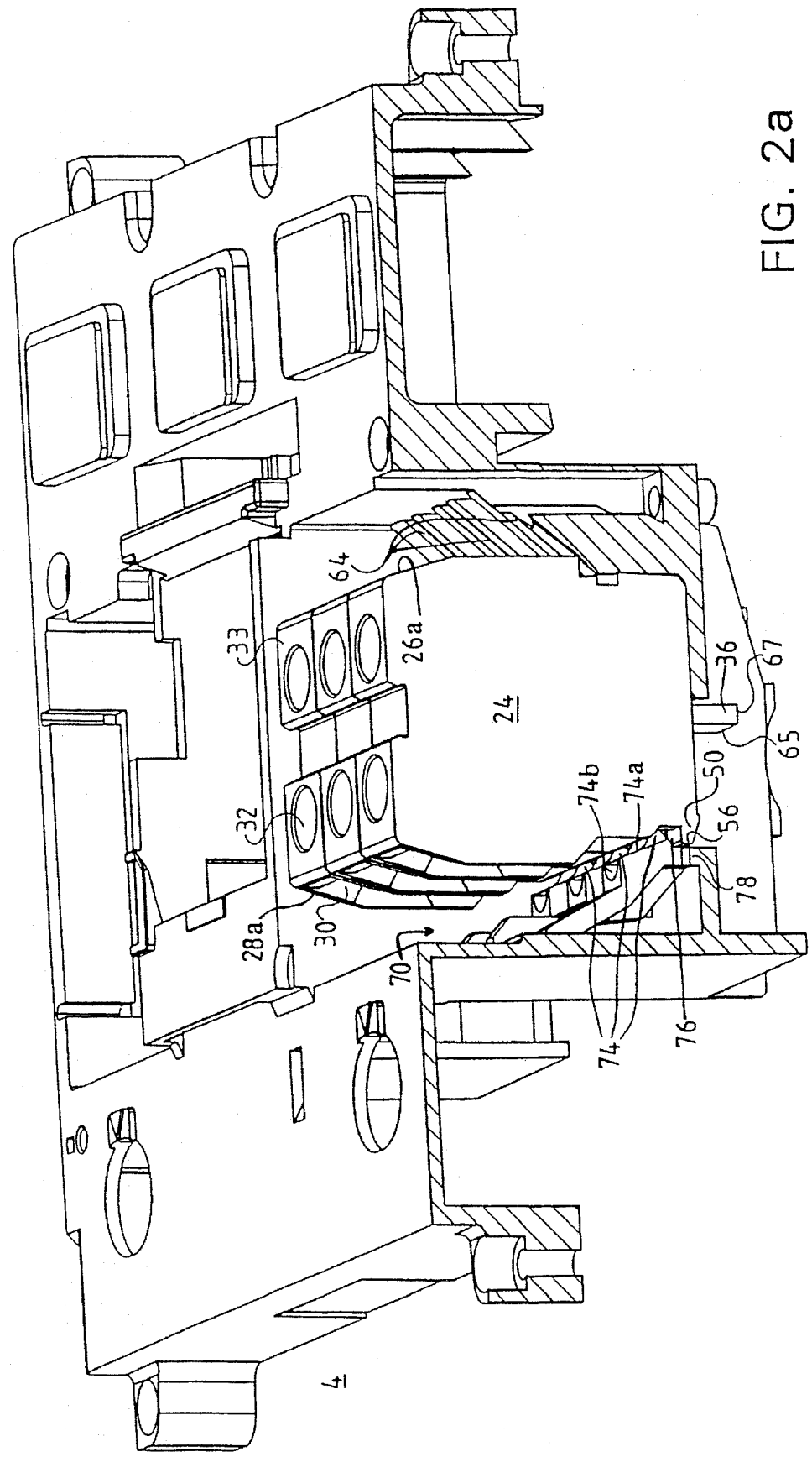
FIG. 2a shows essentially the same view as FIG. 2, but is more detailed.

In accordance with one embodiment of the present invention, the fourth retaining means 70, particularly the web or tab 74, can preferably be accessed by means of a hole or holes 74b (see FIG. 2a). Further, by pressing the retaining web 74 towards the wall 60, it may be possible to move the accessory housing 24 slightly towards wall 60, thereby creating space on the side of the third retaining means 62, so that the guide 44 can be removed from, or slid out of the space 66.

In accordance with at least one embodiment of the present invention, there can preferably be a single fourth retaining means 70, a single guide groove 64, and a single opening 40 in each recess 12, 14, preferably to accommodate a single accessory device 16, 18. However, in accordance with additional embodiments of the present invention, there can preferably be a number of guide and retaining means 62, with a number of guide grooves 64 (see FIG. 2a). Likewise, there can preferably be a number of fourth guide and retaining means 70 with a number of tabs 74 (see FIG. 2a). This multiplicity of third guide and retaining means 62 and fourth guide and retaining means 70 can preferably accommodate a number of accessory devices 16, 18, all of which can preferably have essentially identical housings 24, and which can be installed adjacent one another in the recesses 12, 14. In addition, as briefly mentioned hereinabove, there can also preferably be a number of actuator openings 40 for the actuators 36 of several accessory devices 16, 18.

In accordance with an additional embodiment of the present invention, it may be desirable to make the fourth guide and retaining means 70 from a somewhat flexible material, such as flexible plastic, so that the fourth guide and retaining means 70 would give slightly towards wall 60 when the accessory device 16, 18 is being inserted into the recess 12, 14, particularly when lug 50 slides along, and possibly exerts pressure upon an angled portion 74a (see FIG. 3a) of the fourth guide and retaining means 70.

In addition, and in accordance with one embodiment of the present invention, the third guide and retaining means 62 may also be made of a flexible material, such as a flexible plastic, so that the third guide and retaining means 62 would possibly give slightly towards wall 58 when the accessory device 16, 18 is being inserted into the recess 12, 14. Thus, the guide 44 could could "snap" into place in the space 66.

The disclosure now turns to an example of a current limiting circuit breaker having components which may be utilized in accordance with the embodiments of the present invention. It should be understood that components discussed herebelow with reference to FIGS. 4 and 5 may, if appropriate, be considered to be interchangeable with components discussed hereabove with relation to FIGS. 1–3a.

Figure 4:
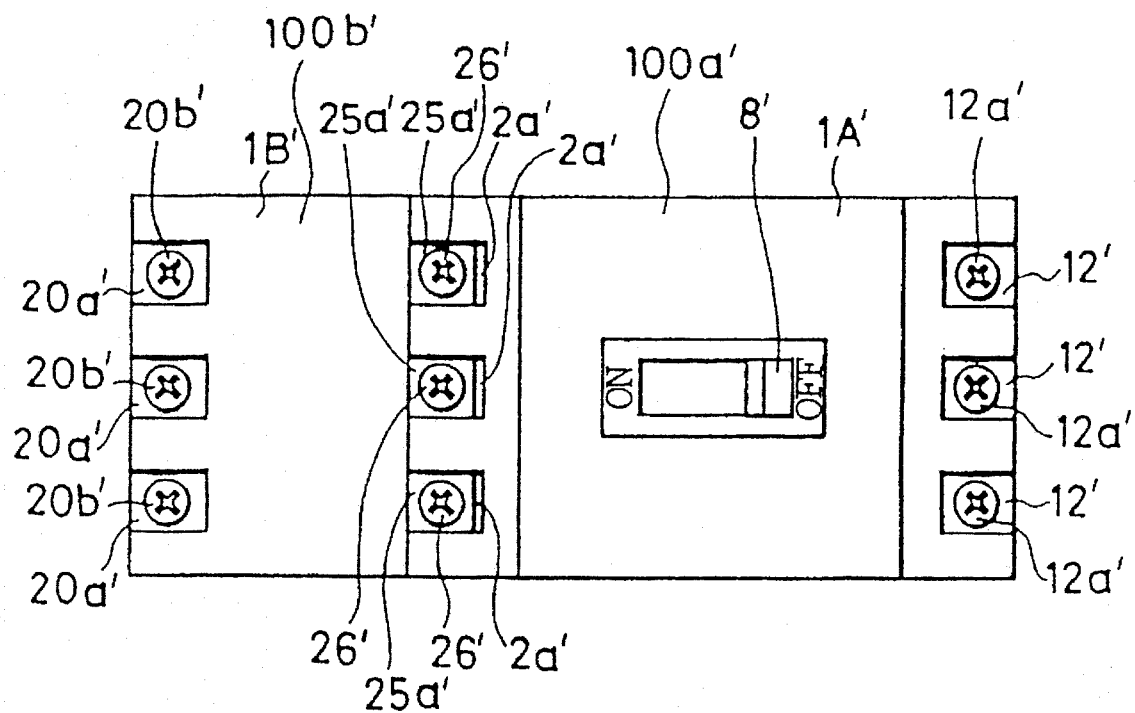
FIG. 4 shows a plan view of a current limiting circuit breaker with which the present invention may be utilized.

As shown in FIG. 4, a current limiting circuit breaker, in which the present invention may be employed, may preferably comprise a circuit breaker unit 1A' and a current limiting unit 1B', which current limiting unit 1B' can preferably be attached to the side face of the circuit breaker unit 1A'. Three load side terminals 12' may be provided on the right side end of the circuit breaker unit 1A' shown in FIG. 4, and three power source side terminals 20a' may be provided on the left side end of the current limiting unit 1B' shown in FIG. 4. The circuit breaker unit 1A' and the current limiting unit 1B' can be formed integrally by connecting a conductor 2' (see FIG. 5) of the circuit breaker unit 1A' and a connection conductor 25' of the current limiting unit 1B'.

Figure 5:
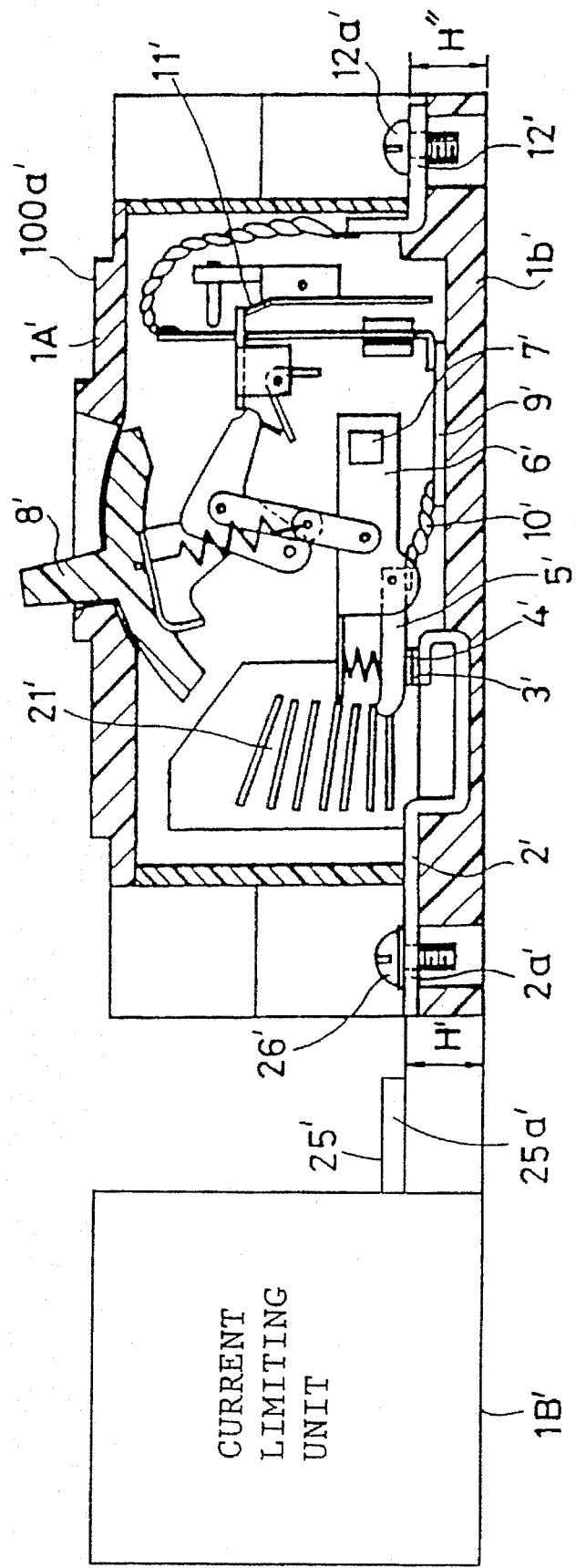
FIG. 5 shows a longitudinal sectional side exploded view showing the current limiting circuit breaker of FIG. 4, with a current limiting unit removed therefrom.

In the circuit breaker unit 1A' shown in FIG. 5, for instance, three stationary conductors 2' may be fixed to a bottom 1b' of the circuit breaker casing 100a', and, at the inner end of each of the stationary conductors 2', there can be corresponding stationary contacts 3'. Movable contacts 4' facing towards the stationary contacts 3', can be provided on movable members 5' which are movably held by contact arms 6', respectively. Each contact arm 6' can be rotatably supported by a cross bar 7'. An operation handle 8' can be provided projecting upward from the substantial center of the front face (upper face in FIG. 5) of the circuit breaker casing 100a'. The contact arms 6' can be turned about the cross bar 7' by turning the operation handle 8'. Thus, the operation handle 8' can preferably be pivotably displaceable between at least a first "on" position and a second "off" position. Conductors 9' which can be fixed to the bottom 1b' of the circuit breaker casing 100a', can connect one end of the flexible connection members 10', and the other ends of the flexible connection members 10' can be connected to the movable members 5'. The fixed conductors 9' can be electrically connected to the load side terminals 12' through overcurrent trip units 11', respectively.

As shown in FIG. 5, the connection terminal 2a' having terminal screw bolts 26' and the load side terminal 12' having terminal screw bolts 12a' can be provided on both sides of the circuit breaker unit 1A'. A height (H') of the connection terminal 2a' and a height (H") of the load side terminal 12' can be provided at the same height measured between each upper face of them and the lower face of the circuit breaker casing 100a'. A connection terminal 25a' of the connection conductor 25' can be projected from the side face of the current limiting unit 1B', and can be provided to ride on the connection terminal 2a' of the circuit breaker unit 1A'. The power source side terminal 20a' of the current limiting unit 1B' can be provided to have height H' from the rear face of the current limiting casing 100b' as shown in FIG. 4, and a terminal screw bolt 20b' can be attached thereto.

By assembling into a unit of the current limiting unit 1B' previously, the current limiting unit 1B' can be connected with the circuit breaker unit 1A', when the current limiting unit 1B' is juxtaposed with the circuit breaker unit 1A' as shown in FIGS. 4 and 5. Because the connection terminal 25a' of the current limiting unit 1B' is disposed on the connection terminal 2a' of the circuit breaker unit 1A', the current limiting unit 1B' can laterally be connected integrally with the circuit breaker unit 1A' by using the terminal screw bolt 26' as shown in FIG. 4.

In FIG. 5, arc extinguishing chambers, disposed within housing 100a', are indicated at 21'.

One feature of the invention resides broadly in the housing structure with accessory devices for power circuit breakers with the following characterizing features: a main housing 2 consisting of a bottom part 6 and a front-side top part 4, which housing 2 encloses a power circuit breaker; at least one accessory housing 24, from which an actuator element 36 projects toward the rear, and each of which encloses an accessory device 16; 18 and contains, in the forward area of its narrow side walls 26; 28 connection openings 30, whose terminal means can be actuated from the front side; on one side or on both sides next to the actuator handle 10 in the top part 4, there is a recess 12; 14 which is essentially enclosed by outside walls which run perpendicular to the front side, in which recess 12; 14 the accessory device 16; 18 can be inserted from the front side, and sits rearward on the base 38 of the recess 12; 14, whereby the base 38 has a slot-shaped actuator opening 40 which guides the actuator element 36; on the accessory housing 24, in the rear portion of its narrow side walls 26; 28, on one hand there is a rigid, interlocking first guide and retaining means 42 which run perpendicular to the front side, and on the other hand a rigid, interlocking second retaining means 48, which have a first retaining shoulder 46 and a second retaining shoulder 52 respectively; from the opposite inside walls 58; 60 of the recess 12; 14, essentially diagonally in relation to the base 38, toward the middle, runs at least one rigid third guide and retaining means which interact with the first guide and retaining means 42, and flexible fourth retaining means 70 which interact with the second retaining means 48 respectively.

Another feature of the invention resides broadly in the housing structure characterized by the fact that the first guide and retaining means 42 are formed by a guide strip 44 molded in the center plane running parallel to the wide side walls of the accessory housing 24, and the end surface of the guide strip 44 facing forward forms the first retaining shoulder 46; the third guide and retaining means 62 are formed by a guide groove 64, which makes a transition on the base side, forming a third retaining shoulder 68 which interacts with the first retaining shoulder 46, into a recessed and laterally limited locator space 66 for the guide strip 44.

Yet another feature of the invention resides broadly in the housing structure characterized by the fact that the second retaining means 48 are represented by a locking lug 50 which runs over the rearward side edge, the forward-facing partial surface of which forms the second retaining shoulder 52, and a laterally limited depression 54 located is formed in front of it; the fourth retaining means 70 are formed by a molded tab, the free end of which points toward the base and has a central retaining web 74 which interacts with the depression 54, and is recessed on both sides of the retaining web 74, forming a fourth retaining shoulder 76 which interacts with the second retaining shoulder 52.

Still another feature of the invention resides broadly in the housing structure characterized by the fact that the recess 12; 14 on both sides of the free end of the fourth retaining means 70, on the base side, has a support web 78 which runs parallel to the locking lug 50 and interacts with a projecting support surface 56 of the locking lug 50, and if necessary is interrupted by the actuator opening(s) 40.

A further feature of the invention resides broadly in the housing structure characterized by the fact that the second retaining means 48 are divided by a guide indentation; the fourth retaining means 70 on their free end make the transition into a central guide web which interacts with the guide indentation.

Another feature of the invention resides broadly in the housing structure characterized by the fact that in the recess 12, there are a multiplicity of third guide and retaining means 62, fourth retaining means 70 and actuator openings 40, all of which are oriented parallel and next to one another.

Yet another feature of the invention resides broadly in the housing structure characterized by the fact that the third guide and retaining means 62, the fourth retaining means 70 and the actuator openings 40 are oriented parallel to the lateral outside walls 20 of the main housing 2.

Still another feature of the invention resides broadly in the housing structure characterized by the fact that the recess 12 or the recesses 12; 14 is or are covered by a cover 22 fastened in a hinge-like manner to the top part 4, which cover can be pivoted out of the way.

Several types of circuit breakers and the components which comprise the circuit breakers which may be utilized in accordance with the present invention may be disclosed in the following U.S. patents: U.S. Pat. No. 4,750,375 to Godesa, entitled "Drive Device for a Circuit Breaker with a Ratchet Wheel"; U.S. Pat. No. 4,678,873 to Preuss and Berndt, entitled "Low Voltage Circuit Breaker Having a Switching Mechanism Arranged in a Separate Chamber"; U.S. Pat. No. 4,380,785 to Demeyr and Claudin, entitled "Solid State Trip Unit for an Electrical Circuit Breaker"; U.S. Pat. No. 4,695,913 to Terracol and Roulet, entitled "Shunt Effect Low Voltage Circuit Breaker"; U.S. Pat. No. 5,077,628 to Neuhouser, entitled "Circuit Breaker Protection Apparatus"; U.S. Pat. No. 4,742,321 to Nagy et al., entitled "Molded Case Circuit Breaker with Accessory Function"; U.S. Pat. No. 4,211,906 to Habedank and Troebel, entitled "Rotary Actuating Device for Low-Voltage Circuit Breakers with Toggle Lever"; and U.S. Pat. No. 4,636,760 to Lee, entitled "Low Voltage Circuit Breaker with Remote Switching Function".

Types of accessory equipment which may be utilized in accordance with the present invention may be disclosed in the following U.S. patents: U.S. Pat. No. 4,370,635 to Carroll et al., entitled "Undervoltage Release Device for a Circuit Breaker"; U.S. Pat. No. 4,467,299 to Collin et al., entitled "Adapter Assembly for Circuit Breaker Undervoltage Release"; U.S. Pat. No. 4,631,624 to Dvorak et al., entitled "Time Delay Undervoltage Release"; U.S. Pat. No. 4,279,007 to Shimp, entitled "Single-phase Fault Detecting Circuit Breaker"; and U.S. Pat. No. 4,604,596 to Yokoyama, entitled "Remotely Controllable Circuit Breaker".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 08 234.7, filed on Mar. 11, 1994, having inventor Uwe Linzenich, and DE-OS P 44 08 234.7 and DE-PS P 44 08 234.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A circuit breaker comprising:

a housing structure;

at least one electrical contact area disposed within said housing structure, said at least one electrical contact area having a stationary contact member;

at least one breaker mechanism for connecting and disconnecting with said at least one electrical contact area, said at least one breaker mechanism being movably disposed within said housing structure; means for manually connecting and disconnecting said at least one breaker mechanism with said at least one electrical contact area;

said means for manually connecting and disconnecting being pivotably displaceable between a first position and a second position;

said at least one breaker mechanism comprising:

contact carrier means pivotably disposed within said housing structure, said contact carrier means having a movable contact member for contacting said stationary contact member of said at least one electrical contact area to complete an electrical circuit;

means for operatively connecting said means for manually connecting and disconnecting with said contact carrier means, said means for operatively connecting being configured for pivotably displacing said contact carrier means with respect to said at least one electrical contact area;

said housing structure comprising:

a main housing comprising a bottom part and a front-side top part, which housing substantially encloses said circuit breaker;

at least one accessory housing, from which an actuator element projects rearwardly, and each of which encloses an accessory device and contains, connection openings, in a forward area within narrow side walls of the at least one accessory housing, whose terminal means are actuated from the front side;

on at least one side adjacent said means for manually connecting and disconnecting there is a recess which is essentially enclosed by outside walls which extend perpendicular to the front side, in which recess the accessory device is inserted from the front side, and sits rearward on a base of the recess, whereby the base has a slot-shaped actuator opening which guides the actuator element;

on the accessory housing, in a rear portion of the narrow side walls, there is a rigid, interlocking first guide and retaining means which extend substantially perpendicular to the front side, and, on a side opposite the first guide and retaining means, there is a rigid, interlocking second retaining means, which have a first retaining shoulder and a second retaining shoulder respectively; and from opposite inside walls of the recess, essentially diagonally in relation to the base, extends at least one rigid third guide and retaining means which interact with the first guide and retaining means, and flexible fourth retaining means which interact with the second retaining means, respectively.

2. Housing structure with accessory devices for power circuit breakers, the housing structure comprising:

a main housing comprising a bottom part and a front-side top part, which housing encloses a power circuit breaker;

at least one accessory housing, from which an actuator element projects rearwardly, and each of which encloses an accessory device and contains, in a forward area within narrow side walls, connection openings, whose terminal means are actuated from the front side;

on at least one side next to an actuator handle for actuating the power circuit breaker in the top part, there is-a recess which is essentially enclosed by outside walls which run perpendicular to the front side, in which recess the accessory device is inserted from the front side, and sits rearward on the base of the recess, whereby base has a slot-shaped actuator opening which guides the actuator element;

on the accessory housing, in a rear portion of the narrow side walls, there is a rigid, interlocking first guide and retaining means which extend substantially perpendicular to the front side, and, on a side opposite the first guide and retaining means, there is a rigid, interlocking second retaining means, which have a first retaining shoulder and a second retaining shoulder respectively;

from opposite inside walls of the recess, essentially diagonally in relation to the base, extends at least one rigid third guide and retaining means which interact with the first guide and retaining means, and flexible fourth retaining means which interact with the second retaining means, respectively.

3. Housing structure as claimed in claim 2, wherein the recess or the recesses is or are covered by a cover hingedly fastened to the top part, which cover is designed to be pivoted away from the recess or recesses.

4. Housing structure as claimed in claim 2 wherein:

the second retaining means are represented by a locking lug which extends over a rearward side edge, a forward-facing partial surface of which forms the second retaining shoulder, and a depression is formed adjacent to the partial surface;

the fourth retaining means are formed by a molded tab, a free end of which points toward the base and has a central retaining web which interacts with the depression, and is recessed on both sides of the retaining web, forming a fourth retaining shoulder which interacts with the second retaining shoulder.

5. Housing structure as claimed in claim 2, wherein in the recess, there are a multiplicity of third guide and retaining means, fourth retaining means, and actuator openings, all of which are oriented parallel and next to one another.

6. Housing structure as claimed in claim 5, wherein the third guide and retaining means, the fourth retaining means and the actuator openings are oriented parallel to the lateral outside walls of the main housing.

7. Housing structure as claimed in claim 6, wherein the recess or the recesses is or are covered by a cover hingedly fastened to the top part, which cover is designed to be pivoted away from the recess or recesses.

8. Housing structure as claimed in claim 2, wherein:
the first guide and retaining means are formed by a guide strip molded in a center plane running parallel to wide side walls of the accessory housing, the wide side walls being substantially perpendicular to the narrow side walls, and an end surface of the guide strip facing forward forms the first retaining shoulder;
the third guide and retaining means are formed by a guide groove, which makes a transition on the base side, forming a third retaining shoulder which interacts with the first retaining shoulder, into a recessed and laterally limited locator space for the guide strip.

9. Housing structure as claimed in claim 8 wherein:
the second retaining means are represented by a locking lug which extends over a rearward side edge, a forward-facing partial surface of which forms the second retaining shoulder, and a depression is formed adjacent to the partial surface;
the fourth retaining means are formed by a molded tab, a free end of which points toward the base and has a central retaining web which interacts with the depression, and is recessed on both sides of the retaining web, forming a fourth retaining shoulder which interacts with the second retaining shoulder.

10. Housing structure as claimed in claim 9, wherein:
the second retaining means are divided by a guide indentation;
the fourth retaining means on their free end make a transition into a central guide web which interacts with the guide indentation.

11. Housing structure as claimed in claim 9, wherein the recess on both sides of the free end of the fourth retaining means, on the base side, has a support web which extends parallel to the locking lug and interacts with a projecting support surface of the locking lug, and is designed to be interrupted by the actuator opening or openings.

12. Housing structure as claimed in claim 11, wherein:
the second retaining means are divided by a guide indentation;
the fourth retaining means on their free end make a transition into a central guide web which interacts with the guide indentation.

13. Housing structure as claimed in claim 12, wherein the recess or the recesses is or are covered by a cover hingedly fastened to the top part, which cover is designed to be pivoted away from the recess or recesses.

14. A method of assembling a circuit breaker, the circuit breaker comprising: a housing structure; at least one electrical contact area disposed within said housing structure, said at least one electrical contact area having a stationary contact member; at least one breaker mechanism for connecting and disconnecting with said at least one electrical contact area, said at least one breaker mechanism being movably disposed within said housing structure; means for manually connecting and disconnecting said at least one breaker mechanism with said at least one electrical contact area; said means for manually connecting and disconnecting being pivotably displaceable between a first position and a second position; said at least one breaker mechanism comprising: contact carrier means pivotably disposed within said housing structure, said contact carrier means having a movable contact member for contacting said stationary contact member of said at least one electrical contact area to complete an electrical circuit; means for operatively connecting said means for manually connecting and disconnecting with said contact carrier means, said means for operatively connecting being configured for pivotally displacing said contact carrier means with respect to said at least one electrical contact area; said housing structure comprising: a main housing comprising a bottom part and a front-side top part, which main housing substantially encloses said circuit breaker; at least one accessory housing, from which an actuator element projects rearwardly, and each of which encloses an accessory device and contains connection openings, in a forward area within narrow side walls of the at least one accessory housing, whose terminal means are actuated from the front side; on at least one side adjacent said means for manually connecting and disconnecting, there is a recess which is essentially enclosed by outside walls which extend perpendicular to the front side, in which recess the accessory device is inserted from the front side, and sits rearward on a base of the recess, whereby the base has a slot-shaped actuator opening which guides the actuator element; on the accessory housing, in a rear portion of the narrow side walls, there is a rigid, interlocking first guide and retaining means which extend substantially perpendicular to the front side, and on a side opposite the first guide and retaining means, there is a rigid, interlocking second retaining means, which have a first retaining shoulder and a second retaining shoulder respectively; and from opposite inside walls of the recess, essentially diagonally in relation to the base, extends at least one rigid third guide and retaining means which interact with the first guide and retaining means, and flexible fourth retaining means which interact with the second retaining means, respectively, said method comprising the steps of:

providing a housing structure;

providing at least one electrical contact area, said at least one electrical contact area having a stationary contact member;

providing at least one breaker mechanism for connecting and disconnecting with said at least one electrical contact area;

providing means for manually connecting and disconnecting said at least one breaker mechanism with said at least one electrical contact area, said means for manually connecting and disconnecting being pivotably displaceable between a first position and a second position;

said step of providing said at least one breaker mechanism further comprising:

providing contact carrier means, said contact carrier means having a movable contact member for contacting said stationary contact member of said at least one electrical contact area to complete an electrical circuit;

providing means for operatively connecting said means for manually connecting and disconnecting with said contact carrier means, said means for operatively connecting being configured for pivotally displacing said contact carrier means with respect to said at least one electrical contact area;

said step of providing said housing structure further comprising:

providing a main housing comprising a bottom part and a front-side top part;

providing at least one accessory housing, from which an actuator element projects toward the rear, and each of which encloses an accessory device and contains, in the forward area of its narrow side walls connection openings, whose terminal means is actuated from the front side;

providing the top part with a recess on at least one side adjacent said means for manually connecting and disconnecting, the recess being essentially enclosed by outside walls which extend perpendicular to the front side;

providing the recess with a base, whereby the base has a slot-shaped actuator opening which guides the actuator element;

providing a first guide and retaining means having a first retaining shoulder, the first guide and retaining means extending substantially perpendicular to the front side;

providing a rigid, interlocking second retaining means having a second retaining shoulder;

providing at least one rigid third guide and retaining means;

providing flexible fourth retaining means;

said method further comprising the steps of:

disposing said electrical contact area within said housing structure;

movably disposing said at least one breaker mechanism within said housing structure;

pivotably disposing said contact carrier means within said housing structure;

disposing the first guide and retaining means on the accessory housing in the rear portion of its narrow side walls;

disposing the third guide and retaining means essentially diagonally in relation to the base, toward the middle of the recess; and inserting the accessory device in the recess from the front side, such that the accessory device sits rearward on the base of the recess, and such that the first guide and retaining means interacts with the third guide and retaining means, and the second retaining means interacts with the fourth retaining means.

* * * * *

UNITED STATES PATENT AND TRADEMARK OFFICE
CERTIFICATE OF CORRECTION

PATENT NO. : 5,539,168
DATED : July 23, 1996
INVENTOR(S) : Uwe LINZENICH

It is certified that error appears in the above-indentified patent and that said Letters Patent is hereby corrected as shown below:

On the title page, item [56], under the "U.S. PATENT DOCUMENTS" section, after '9/1962', delete "Wih-Edmunds" and insert --W. H. Edmunds--.

On the title page, item [57], lines 9-10 under the "ABSTRACT" section, after 'one' delete "another, interacting" and insert --another. Interacting--.

In column 7, line 28, after 'device', delete "14," and insert --18,--.

In column 14, line 29, Claim 2, after 'there', delete "is-a" and insert --is a--.

Signed and Sealed this

Twenty-fifth Day of February, 1997

Attest:

BRUCE LEHMAN

*Attesting Officer*  *Commissioner of Patents and Trademarks*